(12) United States Patent
Nakanishi

(10) Patent No.: US 7,887,962 B2
(45) Date of Patent: Feb. 15, 2011

(54) FUEL CELL SYSTEM AND FUEL CELL SYSTEM CONTROL METHOD

(75) Inventor: Haruyuki Nakanishi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1568 days.

(21) Appl. No.: 10/475,535

(22) PCT Filed: Apr. 24, 2002

(86) PCT No.: PCT/JP02/04096

§ 371 (c)(1),
(2), (4) Date: Oct. 22, 2003

(87) PCT Pub. No.: WO02/089241

PCT Pub. Date: Nov. 7, 2002

(65) Prior Publication Data

US 2004/0137293 A1    Jul. 15, 2004

(30) Foreign Application Priority Data

Apr. 24, 2001   (JP) .............................. 2001-126354

(51) Int. Cl.
*H01M 8/06* (2006.01)

(52) U.S. Cl. ...................... 429/427; 429/428; 429/429; 429/430; 429/431; 429/432; 429/433

(58) Field of Classification Search .................... 429/13, 429/24, 26, 20, 427, 428, 429, 430, 431, 429/432, 433
See application file for complete search history.

(56) References Cited

U.S. PATENT DOCUMENTS

| | | | |
|---|---|---|---|
| 6,649,293 B1 * | 11/2003 | Jones | 429/434 |
| 2002/0068207 A1 | 6/2002 | Baldauf et al. | |
| 2002/0146610 A1 * | 10/2002 | Hayashi et al. | 429/30 |
| 2003/0091875 A1 | 5/2003 | Gebhardt et al. | |
| 2004/0191594 A1 * | 9/2004 | Kearl | 429/19 |

FOREIGN PATENT DOCUMENTS

| | | |
|---|---|---|
| DE | 100 23 036 A1 | 11/2001 |
| DE | 101 52 884 A1 | 1/2003 |
| JP | 1-265460 | 10/1989 |
| JP | 4-233166 | 8/1992 |
| JP | 7-302607 | 11/1995 |
| JP | 8-111230 | 4/1996 |
| JP | 8-195211 | 7/1996 |

(Continued)

*Primary Examiner*—Patrick Ryan
*Assistant Examiner*—Ben Lewis
(74) *Attorney, Agent, or Firm*—Kenyon & Kenyon LLP

(57) ABSTRACT

A fuel cell system and its control method capable of removing condensed water only from a place where flooding is generated, without deteriorating an electrolyte membrane. The electrolyte membrane (10) which is a solid high-molecular membrane is sandwiched by an anode (12) and a cathode (14) and these are sandwiched by collectors (16). Furthermore, these are sandwiched by separators (18), thereby constituting a fuel cell (30). Heating means is arranged on the separator (18) and its switch (20) is turned ON when the moisture for hydration of the electrolyte membrane (10) is condensed, so that current is supplied to the heating means from a power source (22) so as to evaporate the condensed water. This rapidly eliminates flooding.

6 Claims, 6 Drawing Sheets

FOREIGN PATENT DOCUMENTS

| | | |
|---|---|---|
| JP | 8-195212 | 7/1996 |
| JP | 9-50819 | 2/1997 |
| JP | 9-245826 | 9/1997 |
| JP | 2000-67893 | 3/2000 |
| JP | 2000-123854 | 4/2000 |
| JP | 2000-251912 | 9/2000 |
| WO | WO 00/70693 | 11/2000 |

* cited by examiner (a)

(b)

FUEL CELL SYSTEM AND FUEL CELL SYSTEM CONTROL METHOD

TECHNICAL FIELD

The present invention relates to an improved fuel cell system comprising a solid high-molecular membrane as an electrolyte membrane and an improved control method thereof.

BACKGROUND ART

A fuel cell which uses a solid high-molecular membrane as an electrolyte membrane comprises a pair of electrodes arranged so as to sandwich the solid high-molecular membrane, and is configured such that fuel gas such as hydrogen is supplied to a surface of one electrode and oxide gas containing oxygen is supplied to the other electrode, thereby obtaining electric energy. FIG. 5 is a cross sectional view showing a configuration of such a conventional fuel cell. Referring to FIG. 5, an anode 12 which is a hydrogen electrode and a cathode 14 which is an oxygen electrode are disposed on respective sides of an electrolyte membrane 10. Charge collectors 16 are further provided on the outer surfaces of the anode 12 and the cathode 14, respectively, and these charge collectors 16 are then sandwiched by a pair of separators 18.

In order to achieve excellent electrical conductivity, the solid high-molecular membrane used as the electrolyte membrane 10 needs to contain sufficient water for realizing a wet condition. Accordingly, a method has been typically used in which hydrogen to be supplied to the anode 12 and oxide gas such as air to be supplied to the cathode 14 is humidified before being supplied to the fuel cell. In the example shown in FIG. 5, hydrogen to be supplied to the anode 12 is humidified.

However, the conventional fuel cell using a solid high-molecular membrane as described above may suffer from a so-called flooding phenomenon, in which moisture used for humidification is condensed inside pores of the anode 12 which is a hydrogen electrode and of the charge collectors 16 to plug the pores, thereby causing non-uniform flow of hydrogen, as shown in FIG. 6. In such a state, supply of hydrogen is concentrated only in specified portions, where the current density is increased, leading to a problem that the electrolyte membrane 10 would tear. This problem is similarly caused when air which is oxide gas to be supplied to the cathode 14 is humidified.

In order to eliminate the above flooding phenomenon, a method has been proposed, as disclosed in Japanese Patent Laid-Open publication No. 2000-251912, in which a supply tube for gas such as hydrogen or air to be supplied to the fuel cell is heated to thereby reduce condensation of moisture used for humidification.

When the gas supply tube is heated, however, the temperature of the gas to be supplied also increases, and when the heated gas comes into contact with the entire surface of the solid high-molecular membrane, the whole membrane is heated and deteriorates easily.

DISCLOSURE OF THE INVENTION

The present invention was made in view of the above problems of the conventional art, and it is an advantage of the present invention to provide a fuel cell system and a control method thereof which allows removal of condensed water only from a portion of the fuel cell where flooding is generated, without causing deterioration of an electrolyte membrane.

In order to achieve the above advantage, the present invention provides a fuel cell system comprising a fuel cell including an electrolyte membrane sandwiched by a pair of separators, wherein heating means for heating the separator is provided on at least one of the separators, and actuation and de-actuation of the heating means is controlled according to the state of the fuel cell.

Further, in the above fuel cell system, a plurality of fuel cells, each being the above fuel cell, are layered, and the heating means is provided in each fuel cell.

Still further, in the above fuel cell system, control means is provided for controlling actuation and de-actuation of the heating means only for some of the plurality of fuel cells which are layered.

The present invention further provides a method of controlling a fuel cell system comprising a fuel cell including an electrolyte membrane sandwiched by a pair of separators, wherein actuation and de-actuation of heating means for heating the separator provided on at least one of the separators is controlled according to the state of the fuel cell.

In the above method of controlling a fuel cell system, a plurality of fuel cells, each being the above fuel cell, are layered, and the heating means is provided in each fuel cell, and actuation and de-actuation of the heating means is controlled only for some of the plurality of fuel cells.

Still further, in the above method of controlling a fuel cell system, a heating temperature provided by the heating means is 100° C. or higher and 120° C. or lower.

BRIEF DESCRIPTION OF THE DRAWINGS

These and other objects of the invention will be explained in the description below, in connection with the accompanying drawings, in which.

DETAILED EXPLANATION OF PREFERRED EMBODIMENT

Preferred embodiments of the present invention (hereinafter referred to merely as an "embodiment") will be described with reference to the drawings.

Figure 1:
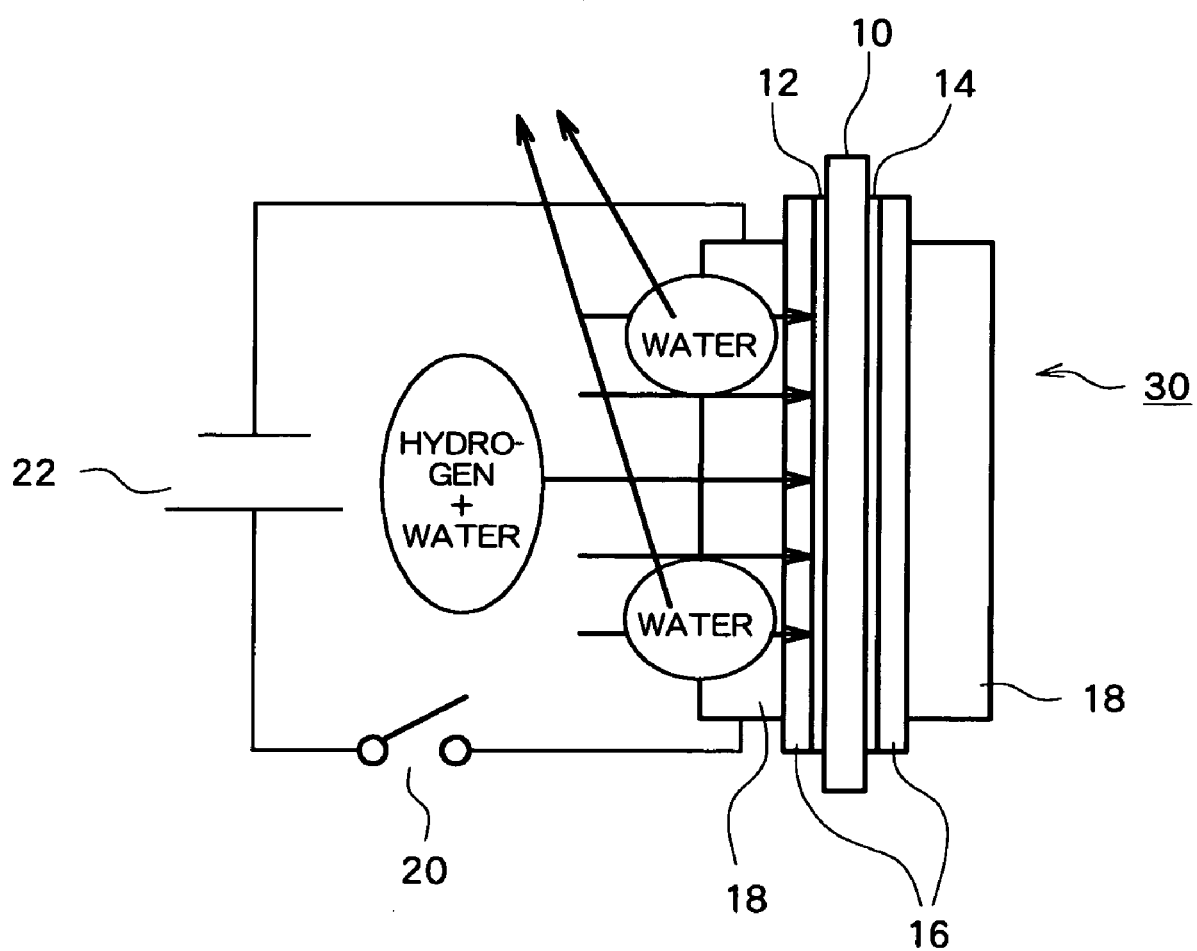
FIG. 1 is a view showing an example configuration of a fuel cell system in accordance with the present invention.
Figure 5:
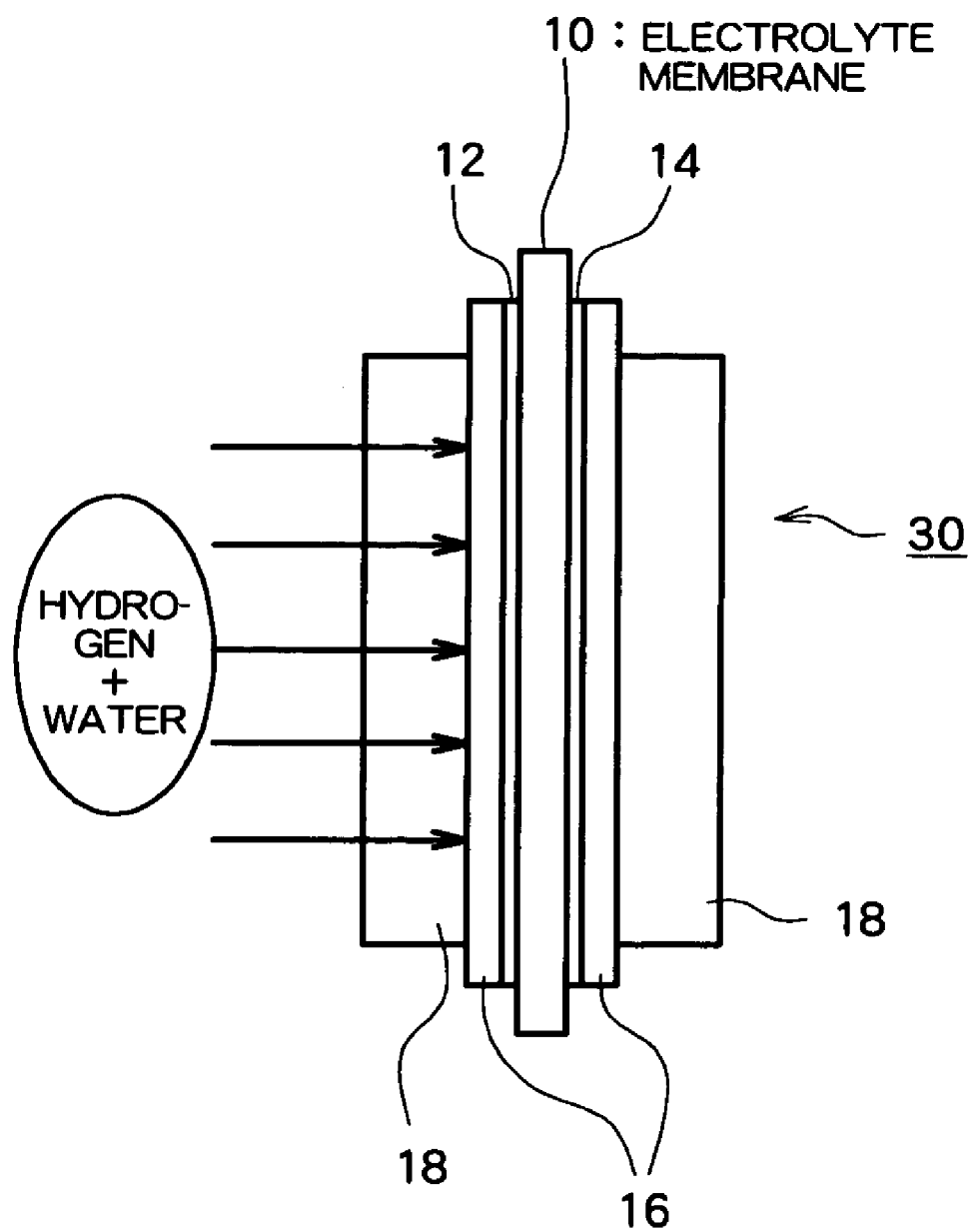
FIG. 5 is a view showing an example configuration of a conventional fuel cell system.
Figure 6:
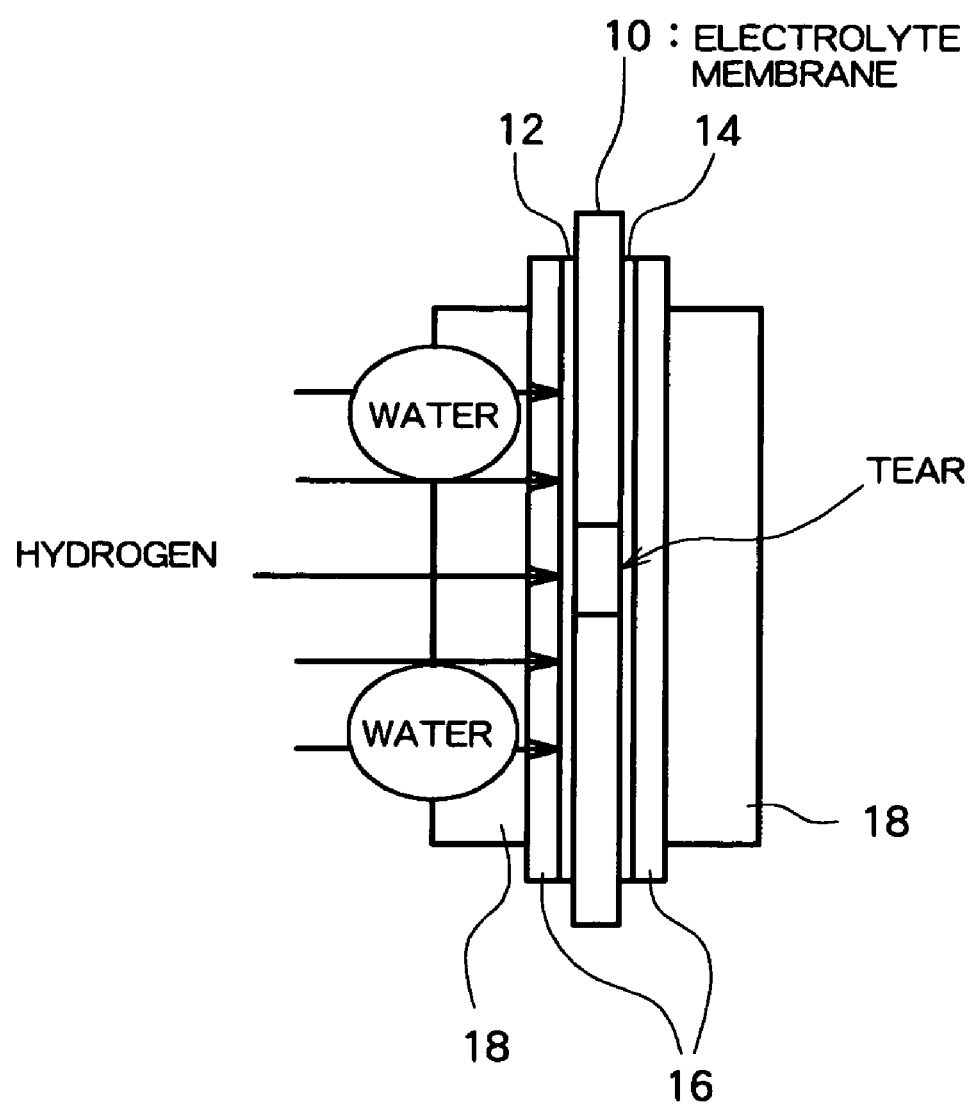
FIG. 6 is a view for explaining how water is condensed in a conventional fuel cell system.

FIG. 1 shows an example configuration of a fuel cell system in accordance with one embodiment of the present invention. In FIG. 1, the same elements as those in FIGS. 5 and 6 are denoted by the same numerals. In this embodiment, similar to the conventional configuration described above, a solid high-molecular membrane is used as an electrolyte membrane 10, an anode 12 and a cathode 14 are disposed on the respective sides of the electrolyte membrane 10, charge collectors 16 are further provided on the outer sides of these electrodes, respectively, and are in turn sandwiched by a pair of separators 18, thereby forming a fuel cell 30.

This embodiment is characterized in that when water is condensed within the separator 18 and the charge collector 16 on the side of the anode 12, to which humidified gas, i.e., hydrogen in the example of FIG. 1, is supplied and flooding is caused, a switch 20 is turned on to supply electric current from a power source 22 to heating means (not shown) provided on the separator 18, thereby heating the separator 18. The heating means may be a heater composed, for example, of a nichrome wire. Alternatively, because these separators 18 are electrically independent of each other, it is also possible to heat the separator 18 itself through energization. Thus, by controlling actuation and de-actuation of the heating means in accordance with generation of flooding in the fuel cell 30, it is possible to quickly remove condensed water generated in the separator 18, thereby preventing damage or the like of the electrolyte membrane due to the increased current density.

A fuel cell system is typically composed of a stack formed by laminating a plurality of fuel cells 30 each having a configuration shown in FIG. 1. Here, it is preferable that such a fuel cell system is configured to allow only the separator 18 of the fuel cell 30 in which flooding is caused to be heated. This prevents excessive temperature rise of hydrogen gas to be supplied, and consequently it is possible to prevent temperature rise of the electrolyte membrane 10 and thus thermal degradation of the electrolyte membrane 10.

Figure 2:
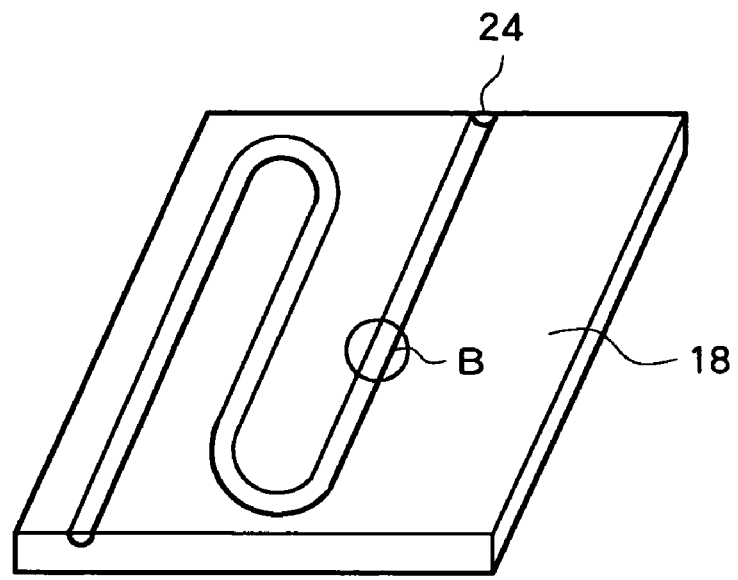
FIG. 2 is a view for explaining a case in which heating means is provided on the separator of the fuel cell system shown in FIG. 1.
Figure 2:
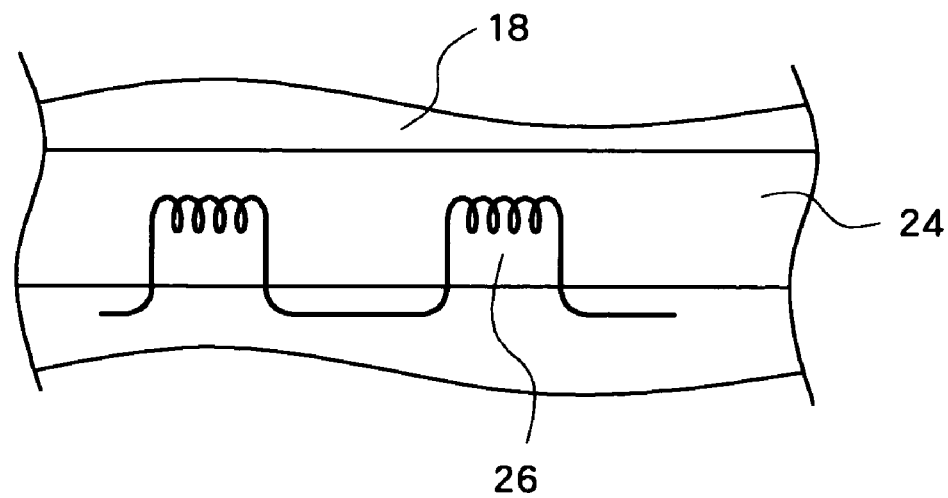

FIGS. 2(a) and 2(b) show an example in which a heater serving as the heating means is provided on the separator 18. As shown in FIG. 2(a), the separator 18 includes a channel 24 formed therein for supplying hydrogen gas or air to the charge collectors 16 functioning as a gas diffusion layer. FIG. 2(b) is an enlarged view of the section B of the channel 24, and shows a heater 26 which is provided in the channel 24 as the heating means. The heater 26 is formed of a nichrome wire or the like and is actuated or de-actuated by controlling energization in accordance with the state of the fuel cell 30, namely the state of generation of condensed water (flooding) in the separators 18, the charge collectors 16, and so on. When the separator 18 is heated by such a heater 26, the heating temperature is preferably 100 C.° or higher and 120 C.° or lower. With the temperature of 100 C.° or higher, it is possible to reliably vaporize the condensed water, and with the temperature of 120 C.° or lower, it is possible to prevent thermal degradation of the electrolyte membrane 10. Further, the heating time suffices as long as the condensed water sufficiently evaporates, and is preferably about several seconds in order to avoid excessive rise in the temperature of the electrolyte membrane 10.

Figure 3:
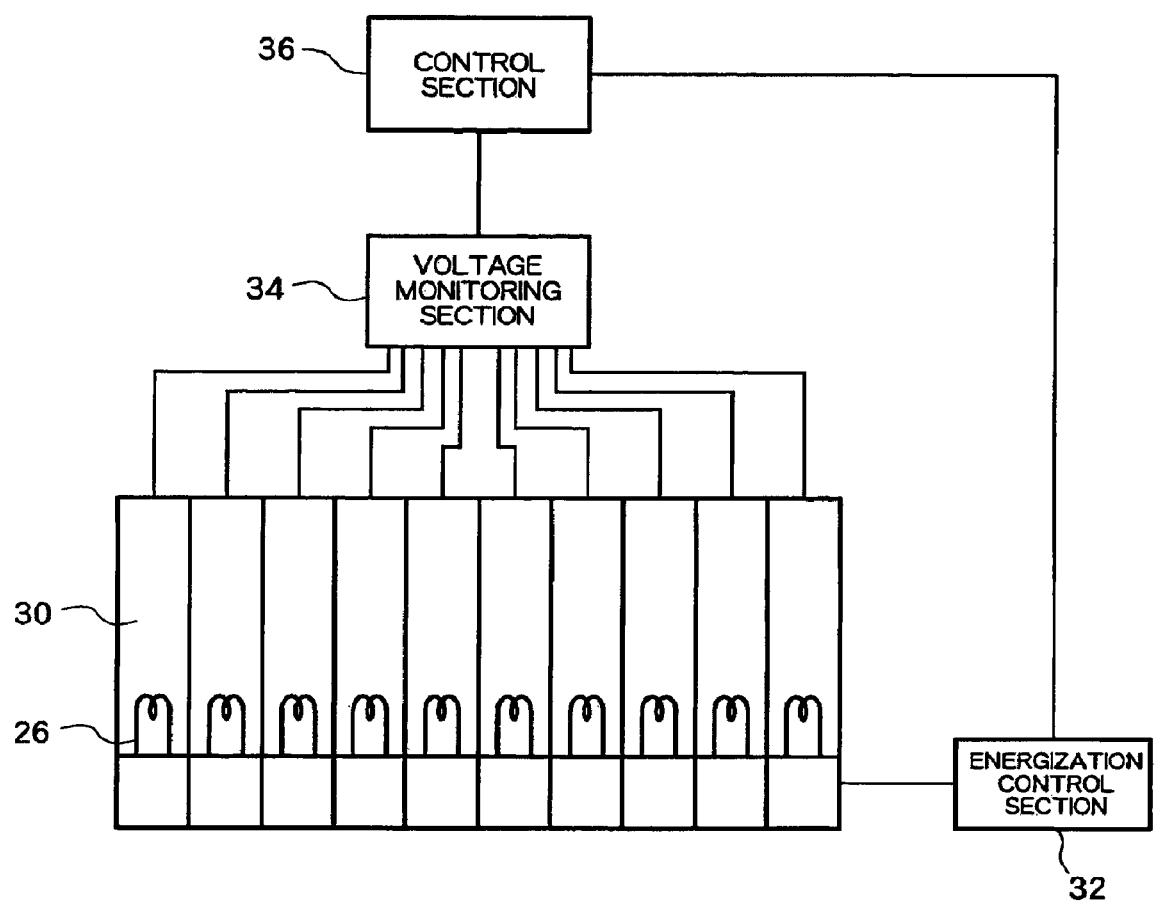
FIG. 3 is a view showing another example configuration of a fuel cell system in accordance with the present invention, in which a plurality of fuel cells, each shown in FIG. 1, are layered to form a stack.

FIG. 3 shows an example in which a plurality of fuel cells each having the configuration shown in FIG. 1 are layered to form a fuel cell stack. In FIG. 3, a tube for supplying hydrogen gas and air is not shown.

Referring to FIG. 3, each fuel cell 30 comprises a heater 26 as the heating means as described in FIGS. 1, 2(a) and 2(b). The energization of the heater 26 is controlled by an energization control section 32. Power generation electromotive force of each fuel cell is sensed by a voltage sensor (not shown) provided for each fuel cell and is input to a voltage monitoring section 34. A phenomenon in which water is condensed in the separator 18 or the like, a so-called flooding phenomenon, is detected using the electromotive force of each fuel cell input to the voltage monitoring section 34.

Figure 4:
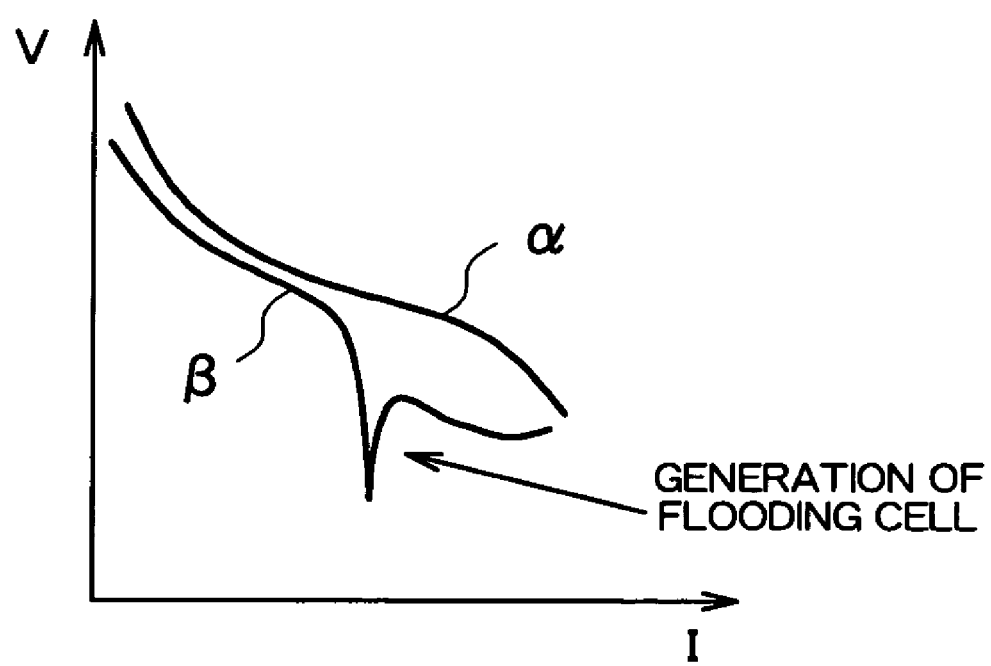
FIG. 4 is a view showing an example of voltage detection at a voltage monitoring section shown in FIG. 3.

FIG. 4 is a view for explaining a principle of detecting such a flooding phenomenon. In FIG. 4, the horizontal axis denotes electric current flowing through each fuel cell 30, and the vertical axis denotes electromotive force of each fuel cell 30. When a fuel cell 30 operates normally with no flooding being generated therein, the relationship between current I and electromotive force V is such that the electromotive force decreases monotonically as the current increases, as shown by the curve α in FIG. 4. On the other hand, when flooding is caused, the electromotive force of the fuel cell 30 is rapidly decreased at a point in time when flooding occurs, as shown by the curve β in FIG. 4. The voltage monitoring section 34 then determines that flooding is generated in the fuel cell 30 for which rapid decrease of electromotive force is detected and outputs a signal indicative of this fuel cell to the control section 36. The control section 36 then outputs a command signal to the energization control section 32 for instructing the energization control section 32 to perform energization control of the heater 26 of the fuel cell 30 for which rapid decrease of the power generation electromotive force as shown in FIG. 4 is detected. The energization control section 32, based on the command signal received from the control section 32, controls energization of the heater 26 of the fuel cell 30 in which flooding is generated, such that the condensed water is evaporated and flooding is eliminated. As described above, the energization time is approximately several seconds and the heating temperature is 100° C. or higher and 120° C. or lower.

With the above configuration, it is possible to quickly detect in which fuel cell 30 of a fuel cell stack flooding is generated, so that energization of the heater 26 serving as the heating means is controlled to thereby eliminate flooding, only with regard to a part of the fuel cell system, namely only with regard to the fuel cell 30 in which flooding is caused. Consequently, it is possible to prevent damage of the electrolyte membrane 10 caused by the increased current density resulting from concentration of hydrogen or air flow in a specified portion of the electrolyte membrane 10. In particular, when a plurality of fuel cells 30 are layered to form a stack as shown in FIG. 3, because the current flowing through the stack is constant, when flooding is caused in a part of such a fuel cell stack, the current density is rapidly increased at a portion of the fuel cell 30 exhibiting the flooding phenomenon where no water drop is generated. Accordingly, it is very effective to use the above configuration so as to prevent damage of the electrolyte membrane 10.

Further, with the above configuration, because energization control of the heater 26 is performed only for the fuel cell 30 in which flooding is caused, it is possible to reduce the temperature rise of the entire stack and therefore prevent the electrolyte membrane 10 from being exposed to a high temperature for a long time. Thus, thermal degradation of the electrolyte membrane 10 can be avoided.

While, in each of the above embodiments, the heater 26 is provided in the separator 18 on the hydrogen supplying side, a similar configuration is also applicable to the separator 18 on the air supplying side, so as to accommodate the configuration in which air, not hydrogen, is humidified.

Moreover, in a stack of fuel cells 30 as shown in FIG. 3, typically, the temperature is reduced and flooding is generated in the fuel cells 30 at the opposite ends. Accordingly, the heater 26 may be provided only in the fuel cell 30 at an end portion where flooding is likely to occur.

INDUSTRIAL APPLICABILITY

As described above, in accordance with the present invention, because the heating means is provided in a portion of a fuel cell where condensation of water is likely to occur, such as a separator, it is possible to evaporate the condensed water effectively, thereby achieving quick elimination of flooding.

Further, when a plurality of fuel cells are layered to form a fuel cell stack, it is possible to selectively heat only a fuel cell in which flooding is generated, so that flooding can be eliminated with only the minimum heating. As a result, it is possible to prevent the entire electrolyte membrane from being exposed to a high temperature for a long time, thereby preventing thermal degradation of the electrolyte membrane.

Still further, because the heating temperature provided by the heating means is set to a range between 100° C. to 120° C., the condensed water can be evaporated quickly while thermal degradation of the electrolyte membrane can be prevented.

What is claimed is:

1. A fuel cell system, comprising:
 a fuel cell stack comprising a plurality of fuel cells, each of the plurality of fuel cells including:
  an electrolyte membrane sandwiched by a pair of separators,
  heating means for heating at least one of the separators provided on the at least one of the separators, and
  control means for controlling actuation and de-actuation of the heating means so that when flooding is determined the heating means is actuated;
 a voltage sensor for sensing an electromotive force of each of the plurality of fuel cells, and
 a voltage monitoring section for monitoring the electromotive force sensed by the voltage sensor,
 wherein the control means controls the actuation and de-actuation of the heating means based on the electromotive force sensed by the voltage sensor, and
 wherein the control means actuates the heating means for a fuel cell in the plurality of fuel cells when the voltage monitoring section detects that the electromotive force of the fuel cell has decreased more rapidly compared to the electromotive force of the fuel cell under a normal operation.

2. A fuel cell system according to claim 1, wherein control means is provided for controlling actuation and de-actuation of the heating means for at least one of the plurality of fuel cells which are layered.

3. A fuel cell system according to claim 1, wherein the heating means is provided within a channel used for supplying gas, the channel being formed in the separator.

4. A fuel cell system according to claim 1, wherein the at least one separator is provided on the anode side of the fuel cell.

5. A method of controlling a fuel cell system, comprising the steps of:
 providing a fuel cell stack comprising a plurality of fuel cells, each of the plurality of fuel cells including an electrolyte membrane sandwiched by a pair of separators and heating means for heating at least one of the separators;
 sensing an electromotive force of a fuel cell of the plurality of fuel cells;
 monitoring the electromotive force sensed by the voltage sensor;
 controlling actuation and de-actuation of the heating means for the fuel cell based on the electromotive force; and
 actuating the heating means when flooding is determined by detecting that the electromotive force of the fuel cell has decreased more rapidly compared to the electromotive force of the fuel cell under a normal operation, and actuation and de-actuation of the heating means is controlled for only some of the plurality of fuel cells.

6. A method of controlling a fuel cell system according to claim 5, wherein
 a heating temperature provided by the heating means is 100° C. or higher and 120° C. or lower.

* * * * *